March 5, 1963  L. A. DAVIS  3,080,470
PORTABLE GUN TYPE SPOT WELDER
Filed Nov. 29, 1960  2 Sheets-Sheet 1
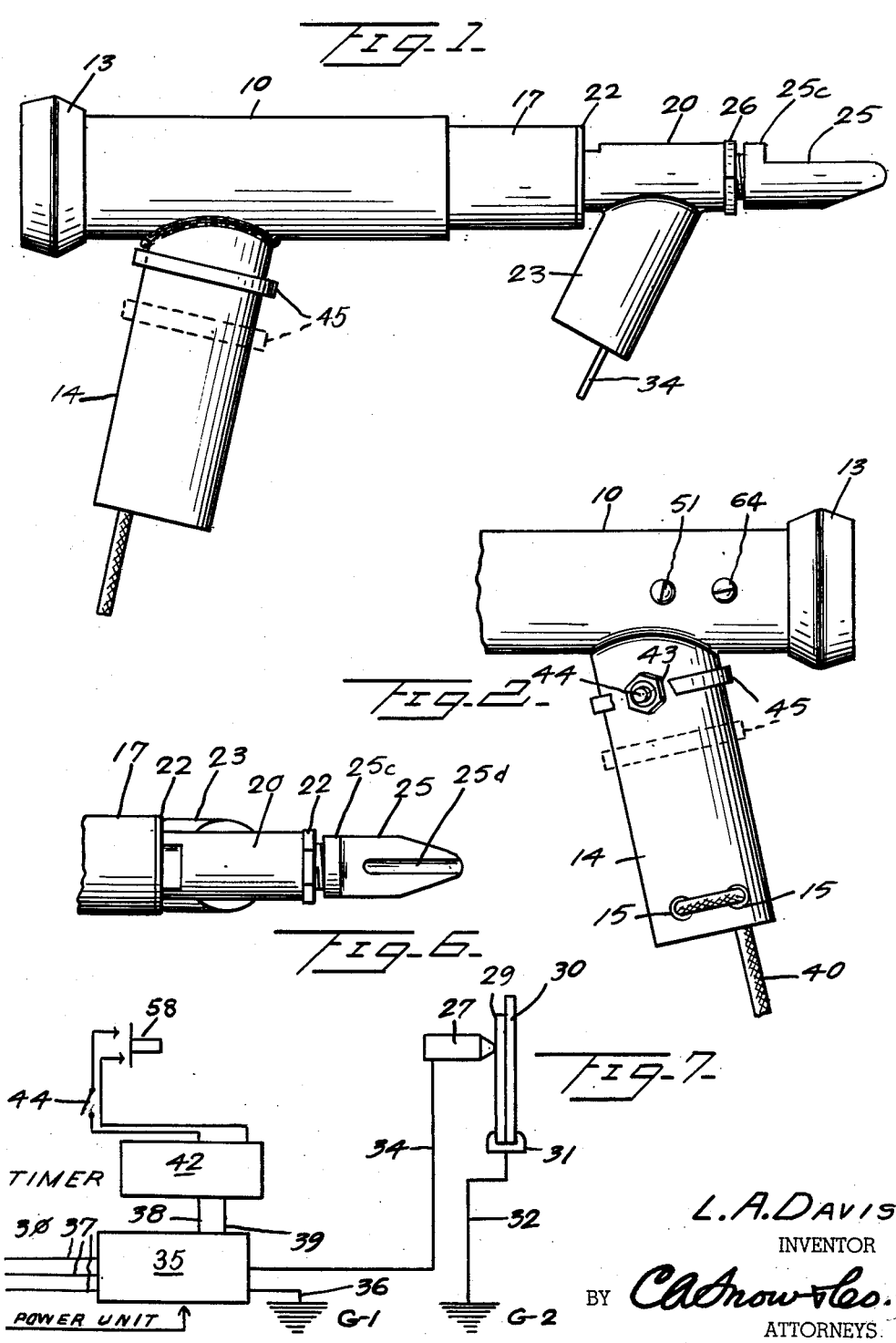
L. A. DAVIS
INVENTOR
BY C. A. Snow & Co.
ATTORNEYS March 5, 1963
L. A. DAVIS
3,080,470
PORTABLE GUN TYPE SPOT WELDER
Filed Nov. 29, 1960
2 Sheets-Sheet 2
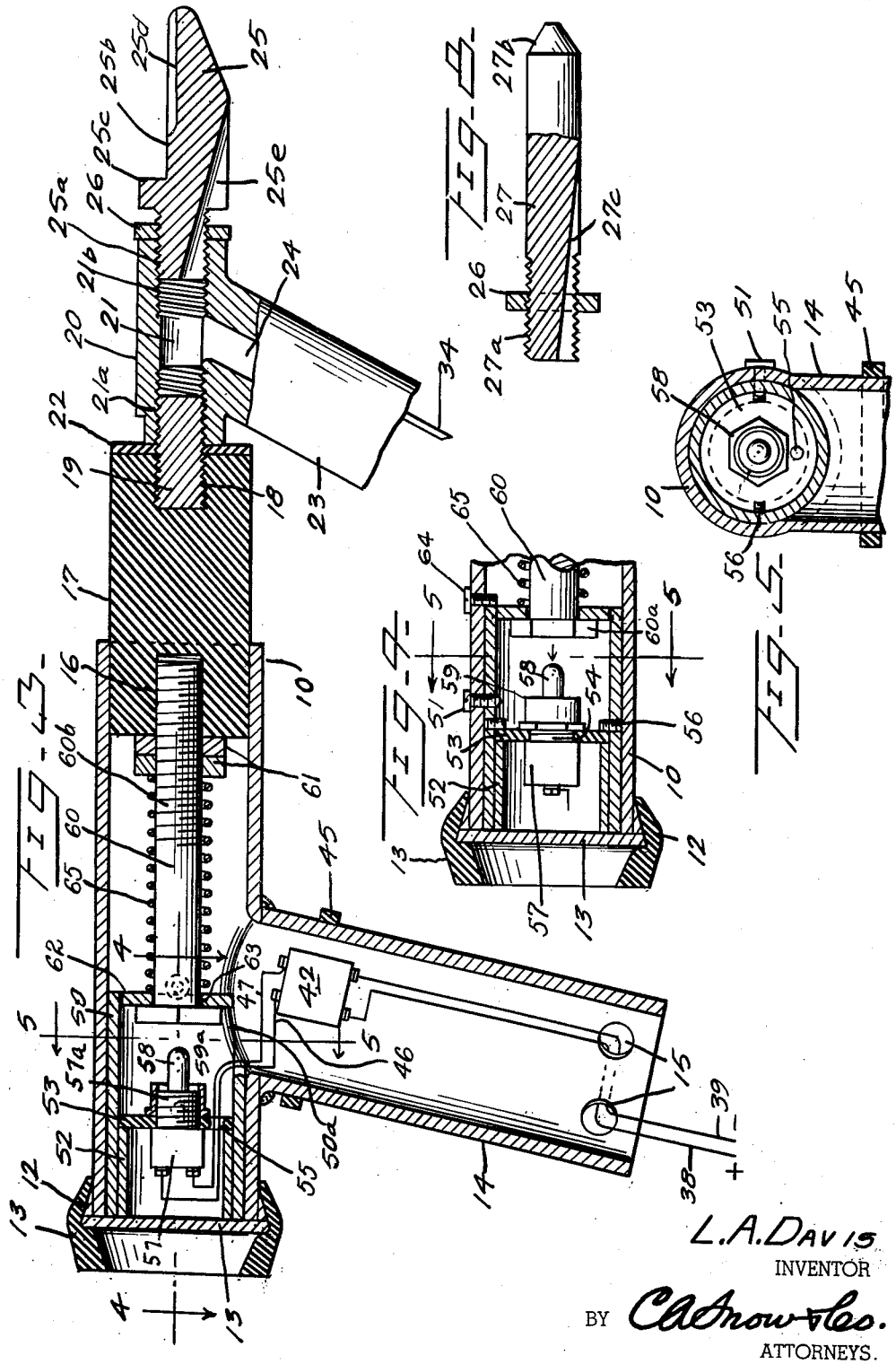
L.A.DAVIS
INVENTOR
BY Ch Snow &Co.
ATTORNEYS.

United States Patent Office 3,080,470
Patented Mar. 5, 1963

3,080,470
PORTABLE GUN TYPE SPOT WELDER
Louis A. Davis, 960 Heartwood, Vallejo, Calif.
Filed Nov. 29, 1960, Ser. No. 72,373
5 Claims. (Cl. 219—86)

This invention relates to an electric welder of the portable type, primarily for performing spot welding operations.

The object of the present invention is to provide an electric welder of the gun type which is adapted for use where a semi-portable welder is required, for instance on the assembly floor of a shop, or on a bench, where only limited portability is required.

Another object of the present invention is to provide a portable spot welder which is particularly adapted to the welding of studs, clips, pins, brackets of "Monel" metal or stainless steel, to other steel members.

A further object of the present invention is to provide a portable spot welder having an air cooled tip.

An additional object of the present invention is to provide a portable electric welder which is operable on a low current input, constant voltage and high current output D.C. rectifier.

Still other objects, advantages and improvements will become apparent from the following specification, taken in connection with the accompanying drawings, in which:

FIGURE 1 is a side elevational view of the portable electric gun according to the present invention.

FIG. 2 is a partial side elevational view of the opposite side of the portable electric welding gun, showing the location of the "On" and "Off" switch.

FIG. 3 is a vertical sectional view through the portable electric welding gun, showing the internal details.

FIG. 4 is a horizontal sectional view, taken on the section line 4—4 of FIG. 3 and looking in the direction of the arrows, showing the details of the pressure operated switch.

FIG. 5 is a vertical sectional view, taken on the section line 5—5 of FIG. 4 and looking in the direction of the arrows, and also showing the details of the pressure operated switch.

FIG. 6 is a top plan view of the portable electric welding gun, showing in particular the die tip.

FIG. 7 is a circuit diagram showing the connection of the portable electric welding gun to the D.C. rectifier and the timer.

FIG. 8 is a partial vertical sectional view showing a modified form of the die tip.

Referring now to the drawings in detail and to FIGS. 1 and 2 in particular, the portable electric welding gun according to the present invention is here shown with certain components mounted on and others enclosed within a cylindrical body or barrel 10, which latter is preferably of thick walled aluminum tubing. This barrel 10 is open at its forward end and closed at its rear end by a cylindrical push plate 11, which latter is welded thereto by a fillet weld 12. The push plate 11 is slightly larger in diameter than the external diameter of the barrel 10 to provide a base for the fillet weld 12. A butt 13 of medium hard rubber may be fitted over the push plate 11 and the fillet weld 12 to ease the counter thrust on the operator's body, if desired.

A handle or grip 14 is also of thick walled aluminum tubing and is secured to the barrel 10, as by welding, at an oblique angle to the forward section of the latter. This grip is preferably elliptical in cross section to facilitate holding same in the operator's hand.

In the outer end of the barrel 10 there is reciprocably mounted a plunger 17 of insulating material, such as "Bakelite." This plunger 17 has a threaded bore 18 at its front end, in which there is mounted a threaded stud 19. For mounting the die tip 25 on the plunger 17 a holder or bus bar 20 is provided. This bus bar is preferably made of block aluminum or copper. An axial bore 21 is formed through the bus bar 20 and this bore is threaded at its outer end at 21b. The threaded inner end 21a of the bore in the bus bar 20 receives the stud 19 to secure the bus bar to the plunger 17. A locking plate 22 has an axially threaded hole therethrough and surrounds the stud 19 to hold the latter in the threaded axial bore 18 of the plunger. An integral extension 23 is formed on the bus bar 20 and at an oblique angle to the forward section of the latter. This extension 23 has an axial bore 24 therethrough, which communicates with the axial bore 21 through the bus bar 20. Cooling air from a source (not shown) is forced through the axial bore 24 in the extension 23 and the axial bore 21 in the bus bar 20. A heavy conductor 34, which carries the welding current, is secured in any suitable manner (not shown) to the extension 23 of the bus bar 20.

The die tip 25 has a threaded stud 25a at its rear end, which is received in the forward threaded axial bore 21b in the bus bar 20. A lock nut 26 surrounds the stud 25a and abuts the outer end of the bus bar 20 to firmly hold the stud 25a in the outer threaded end 21b of the axial bore in the latter. On its top the die tip has a flat surface 25b on which flat type work pieces, such as clips or brackets, are received, and also a shoulder 25c against which such work pieces abut. Further in the top there is formed a semi-cylindrical groove 25d in which cylindrical work pieces, such as studs or pins, are received. In its bottom the die tip is formed with an arcuate groove 25c, which is inclined with respect to the longitudinal center line and extends to the rear of the tip. The latter groove provides an expansion passage for the cooling air from the axial bore 21 in the bus bar 20, the exit and expansion of the cooling air through the passage limiting the rise in temperature of the die tip 25 during the welding operation.

In FIG. 8 there is shown at 27 a modified form of the die tip, one that is primarily intended for welding plates. The die tip here is of generally cylindrical shape and has its inner end threaded at 27a and a frusto-conical outer end at 27b. An arcuate groove 27c is formed in the bottom of the die tip 27, inclined with respect to the longitudinal axis of the latter and extends from adjacent the mid-section to the rear of the die tip. This groove functions for the exit and expansion of the cooling air in the same manner as the groove 25c in the construction according to FIG. 3.

Referring now to FIG. 7, the wiring diagram is here shown. Two (2) work pieces to be welded together are shown at 29 and 30, with the die tip 27 pressed against one of them. The two (2) pieces are held together during the welding operation by a clamp 31, which latter is connected to the ground at G-2 by a conductor 32. The conductor 34 from the die tip 27 extends to one output terminal of a power unit 35; the other output terminal of this power unit is connected by a conductor 36 to a ground at G-1.

The power unit 35 is supplied from a three (3) phase A.C. line of any desired voltage, preferably 220 volts, indicated at 37. This power supply includes a transformer (not shown) and a double wave selenium or silicon rectifier (also not shown), which develops full wave constant voltage.

A timer 42 is mounted in the grip 14 of the welding gun in any suitable manner and is connected in the primary circuit of the power unit 35 by conductors 38 and 39. It is preferable to connect the timer 42 in the primary circuit of the power unit 35 but it could also be connected in the secondary circuit. As shown in FIG. 2, the conductors 38 and 39 are encased by a heavy cable 40.

In order to minimize strain on the cable 40 due to sudden jerks, it is passed through a couple of holes 15—15, in the wall of the grip 14.

The timer 42 includes an "On" and "Off" switch which extends through a suitable hole in the wall of grip 14 and is held in place by a lock nut 43. This switch has a centrally positioned toggle lever 44. A thick elastic band 45 is slidable along the grip 14 and may be positioned over the switch lever 44 to hold the switch in the "On" position.

An outer sleeve 50 is mounted in the bore of the barrel 10, abutting at its outer end the push plate 13. At its inner end this sleeve is cut away along an arcuate section 50a of its side wall, which cut away section is aligned with the bore through the grip 14. The sleeve 50 is held in place by a set screw 51, which extends through a suitable threaded hole in the barrel 10.

An inner and shorter sleeve 52 is mounted within the outer sleeve 50 and also abuts the push plate 13 at its outer end. Over the inner end of the sleeve 52 there is placed a circular plate 53, which has an axial hole 54 and also an eccentrically positioned hole 55 of smaller diameter therein. The inner sleeve 52 and the circular plate 53 are secured in position by diametrically positioned set screws 56—56, which extend through threaded holes in the wall of the outer sleeve 50 and abut the outer face of the circular plate 53.

The inner sleeve 52 and the circular plate 53 mount the pressure operated switch. This switch is positioned axially of the barrel 10. It is enclosed by a casing 57, which has a forward extension 57a reduced in diameter and screw threaded. A push rod 58 extends axially from the extension 57a of the switch casing. This extension is received within the axial hole 54 in the circular plate 53 and by an internally screw threaded thimble 59, which is received on the extension and abuts the circular plate. Conductors 46 and 47 extend from the timer 42 to terminals on the switch casing 57, passing through the hole 55 in the circular plate 53, and connect the switch in the timer circuit.

The push rod 58 is operated by an aligned reciprocatory rod 60 having a hexagonal head 60a thereon and a screw threaded outer end 60b. The latter is received in a screw threaded axial bore 16 in the inner end of the plunger 17. Lock nuts 61—61 surround the threaded outer end 60b of the rod 60 and hold same securely within the threaded axial bore 16 in the plunger 17. A disc 62 has an axial hole 63 therein and surrounds the rod 60, abutting the head 60a on the latter, and is guided within the outer sleeve 50. Around the rod 60 there is a coiled compression spring 65, which at its outer end abuts the outermost lock nut 61 and at its inner end the disc 63 to hold the latter against the head 60a of the rod. A stop for limiting outward movement of the rod 60, and also the plunger 19, is formed by a set screw 64, which extends through a suitable screw threaded hole in the wall of the barrel 10.

In operation, it has been previously pointed out that the die tip 25 may be used for welding flat work pieces, such as clips or brackets, which latter are placed on the flat surface 25b and against the shoulder 25c; also that it may be used for welding cylindrical work pieces, such as studs or pins, these being placed in the semi-cylindrical groove 25d in the die tip. It may also be used for ordinary spot welding, as shown in FIG. 7. The "On" and "Off" switch 57 will ordinarily be used to turn on the power to the gun when the welding work is started and to turn same off when the work has been finished. As previously stated, this switch may be set in the "On" position and held there by sliding the elastic ring 45 along the barrel 14 and over the switch.

The timer 46 is set for the job requirement and the electrical power turned on at the switch 44. The die tip 25 is placed on the object to be spot welded and the gun held in approximately right angle position to the work. As the gun is forced against the work pieces, the plunger 17 will be pushed rearwardly within the barrel 10 and the head 60a on the rod 60 will contact the plunger 58 of the switch 57 and close the circuit through the timer 42. The pressure on the gun should not be released until the timer 42 has completed its period of operation and interrupted the circuit. Thus any arcing from the die tip 25 to the work piece is avoided due to sudden interruption of the arc.

Having now fully described my invention, what I claim as new and useful and desire to secure by Letters Patent of the United States is:

1. A portable welding gun having a barrel closed at one end, a plunger slidable in the other end of said barrel, a die tip carried by said plunger, a welding circuit including said die tip, a sleeve mounted within said barrel and abutting the closed end of the latter at one end, a disc mounted on the other end of said sleeve, and a switch mounted by said disc and connected in the welding circuit and operable by said plunger.

2. A portable welding gun having a barrel closed at one end, a plunger slidable in the other end of said barrel, a die tip carried by said plunger at its outer end, a rod carried by said plunger at its inner end, a disc mounted on said rod, a sleeve mounted within the barrel abutting the closed end of the latter at one end and guiding said disc in sliding movement of the latter, a welding circuit including said die tip, and a switch mounted within said sleeve and connected in the welding circuit and operable by said rod.

3. A portable welding gun having a barrel closed at one end, a plunger slidable in the other end of said barrel, a die tip carried by said plunger at its other end, a rod having an abutment on its outer end carried by said plunger at the inner end of the latter, a disc mounted on said rod against said abutment, a coiled compression spring surrounding said rod and abutting the disc at one end and the inner end of the plunger at its other end, a sleeve mounted within the barrel abutting the closed end of the latter at one end and guiding said disc in sliding movement of the latter, a welding circuit including said die tip, and a switch connected in said welding circuit and operable by the abutment on said rod.

4. A portable welding gun having a barrel closed at one end, a plunger slidable in the other end of said barrel, a die tip carried by said plunger at its outer end, a rod having an abutment on its outer end carried by said plunger at the inner end of the latter, a movable disc mounted on said rod against said abutment, a coiled compression spring surrounding said rod and abutting the movable disc at one end and the inner end of the plunger at its other end, an outer sleeve mounted within the barrel abutting the closed end of the latter at one end and guiding said disc in sliding movement of the latter, an inner sleeve mounted within said outer sleeve and also abutting the closed end of the barrel at one end, a fixed disc mounted over the other end of the inner sleeve, a welding circuit including said die tip, and a switch mounted by said fixed disc and connected in the welding circuit and operable by the abutment on said rod.

5. A portable welding gun having a cylindrical barrel closed at one end, a plunger slidably mounted in the other end of said barrel, a die tip carried by said plunger at its outer end, rod having an abutment on its outer end secured to said plunger at the inner end of the latter, a sleeve mounted within the barrel and abutting the closed end of the latter, a disc mounted on said rod against the abutment for sliding movement within said outer sleeve, a coiled compression spring surrounding said rod and abutting said disc at one end and the inner end of the plunger at its other end, a fixed disc mounted within said sleeve, a welding circuit including said die tip, and a switch connected in the welding circuit and mounted axially on said fixed disc and in the path of movement of the abutment on said rod.

References Cited in the file of this patent

UNITED STATES PATENTS

| 1,318,563 | Isherwood et al. | Oct. 14, 1919 |
| 2,021,173 | Clark | Nov. 19, 1935 |
| 2,245,920 | Jardine et al. | June 17, 1941 |
| 2,454,338 | Pityo et al. | Nov. 23, 1948 |
| 2,812,418 | Allan et al. | Mar. 5, 1957 |

FOREIGN PATENTS

| 807,723 | Great Britain | Jan. 11, 1959 |